(12) United States Patent
Wahl et al.

(10) Patent No.: US 12,335,907 B2
(45) Date of Patent: Jun. 17, 2025

(54) METHOD FOR SETTING UP A LOCALIZATION SYSTEM, AND LOCALIZATION SYSTEM

(71) Applicant: TRUMPF Tracking Technologies GmbH, Ditzingen (DE)

(72) Inventors: Eberhard Wahl, Weilheim an der Teck (DE); Christoph Röhm, Stuttgart (DE); Daniel Bossert, Nussdorf (DE)

(73) Assignee: TRUMPF TRACKING TECHNOLOGIES GMBH, Ditzingen (DE)

(*) Notice: Subject to any disclaimer, the term of this patent is extended or adjusted under 35 U.S.C. 154(b) by 0 days.

(21) Appl. No.: 18/823,724

(22) Filed: Sep. 4, 2024

(65) Prior Publication Data

US 2024/0430852 A1    Dec. 26, 2024

Related U.S. Application Data

(63) Continuation of application No. PCT/EP2023/053500, filed on Feb. 13, 2023.

(30) Foreign Application Priority Data

Mar. 10, 2022    (DE) .................... 10 2022 105 717.8

(51) Int. Cl.
*H04W 64/00*        (2009.01)
*H04B 1/7163*        (2011.01)
(52) U.S. Cl.
CPC ........ *H04W 64/003* (2013.01); *H04B 1/7163* (2013.01)
(58) Field of Classification Search
CPC ..... H04W 64/00; H04W 4/021; H04W 4/029; H04W 24/08; H04W 4/02; H04W 4/023;
(Continued)

(56) References Cited

U.S. PATENT DOCUMENTS 7,839,916 B1 * 11/2010 Luecke .................. G01S 19/31
                                                    375/147
9,386,421 B2 *  7/2016 Bolon ..................... H04L 67/52
(Continued)

FOREIGN PATENT DOCUMENTS

CN        111343571 A  *  6/2020
CN        112702696 A      4/2021
(Continued)

OTHER PUBLICATIONS

Tian Xin et al., Calibration method of anchor position in indoor environment based on two-step extended Kalman filter, Multidimensional Systems and Signal Processing, Apr. 2021, pp. 1141-1158, vol. 32, Springer, USA, DOI: 10.1007/S11045-021-00779-8.

(Continued)

*Primary Examiner* — Matthew C Sams
(74) *Attorney, Agent, or Firm* — LEYDIG, VOIT & MAYER, LTD.

(57) ABSTRACT

A method for setting up a localization system that includes a multiplicity of stationary radio transmitters and a mobile radio transmitter is provided. The method includes determining, by the localization system, multiple relative location references between the mobile radio transmitter and a respective stationary radio transmitter by using an ultrawideband radio technology. Each of a plurality of stationary radio transmitters of the multiplicity of stationary radio transmitters includes a respective mobile radio module. The method further includes performing a positioning of the stationary radio transmitters with the mobile radio module by performing a coarse localization and a fine localization. The coarse localization is performed via mobile radio. The positioning of the stationary radio transmitters via the coarse localization is improved by the fine localization. The method further includes determining a position of the mobile radio (Continued)

transmitter using the positioning of the stationary radio transmitters improved by the fine localization.

17 Claims, 7 Drawing Sheets

(58) Field of Classification Search
CPC ......... H04W 4/33; H04W 4/80; H04W 84/12;
G01S 5/0263; G01S 5/0036; G01S
5/0236; G01S 5/0258; G01S 5/14; G01S
19/12; G01S 19/14; G01S 19/31; G01S
19/37; G01S 19/42; G01S 19/48; G01S
19/51; G01S 2205/008; G01S 5/0009;
G01S 5/0081; G01S 5/02; G01S 5/0205;
G01S 5/021; G01S 5/0221; G01S 5/0244;
G01S 5/0249; G01S 5/0252; G01S
5/0289; G01S 5/06; G01S 5/145; G01S
7/4865; G01C 21/206; G01C 21/32
See application file for complete search history.

(56) References Cited

U.S. PATENT DOCUMENTS

| | | | |
|---|---|---|---|
| 10,659,679 B1 | 5/2020 | Beeler et al. | |
| 10,775,475 B2* | 9/2020 | Bauer | H04W 64/00 |
| 11,070,948 B2* | 7/2021 | Shirakata | H04M 11/00 |
| 11,356,801 B1* | 6/2022 | Mahmood | H04W 4/021 |
| 11,644,525 B2* | 5/2023 | Silverman | G01S 5/0249 |
| | | | 455/456.1 |
| 11,946,745 B2* | 4/2024 | Kadelka | H04W 4/38 |
| 2008/0186231 A1* | 8/2008 | Aljadeff | G01S 5/06 |
| | | | 342/387 |
| 2013/0303185 A1 | 11/2013 | Kim et al. | |
| 2016/0193729 A1 | 7/2016 | Williams | |
| 2018/0231668 A1 | 8/2018 | Xia et al. | |
| 2021/0070332 A1 | 3/2021 | Hanczor et al. | |
| 2021/0072027 A1 | 3/2021 | Marques et al. | |
| 2021/0248283 A1 | 8/2021 | Kincart et al. | |
| 2022/0108471 A1 | 4/2022 | Bossert et al. | |
| 2022/0137176 A1* | 5/2022 | Silverman | H04W 4/80 |
| | | | 455/456.1 |
| 2022/0201427 A1* | 6/2022 | Rechenberger | H04W 4/029 |
| 2022/0236061 A1* | 7/2022 | Kadelka | H04W 4/20 |
| 2023/0180175 A1* | 6/2023 | Li | H04W 64/00 |
| | | | 455/456.1 |
| 2023/0296721 A1* | 9/2023 | Li | G01S 5/0258 |
| | | | 342/451 |
| 2023/0365021 A1* | 11/2023 | Crossman | G06F 21/44 |
| 2023/0375657 A1* | 11/2023 | Subramaniam | G01S 5/0242 |
| 2024/0323897 A1* | 9/2024 | Barbu | H04L 5/0094 |

FOREIGN PATENT DOCUMENTS

| | | | | |
|---|---|---|---|---|
| CN | 112929823 A | * | 6/2021 | |
| CN | 113281795 A | * | 8/2021 | G01S 19/42 |
| EP | 3002603 A1 | | 4/2016 | |
| EP | 3644296 A1 | | 4/2020 | |
| KR | 102284464 B1 | | 8/2021 | |
| WO | WO 2016065368 A1 | | 4/2016 | |
| WO | WO 2020212723 A1 | | 10/2020 | |
| WO | WO 2020229662 A1 | | 11/2020 | |

OTHER PUBLICATIONS

Pelka Mathias et al., Iterative approach for anchor configuration of positioning systems, ICT Express 2, Mar. 2016, pp. 1-4, vol. 2, DOI: 10.1016/j.icte.2016.02.009.
De Preter Andreas et a., Range Bias Modeling and Autocalibration of an UWB Positioning System, IEEE, Sep. 2019, pp. 1-8, DOI: 10.1109/IPIN.2019.8911815.

* cited by examiner

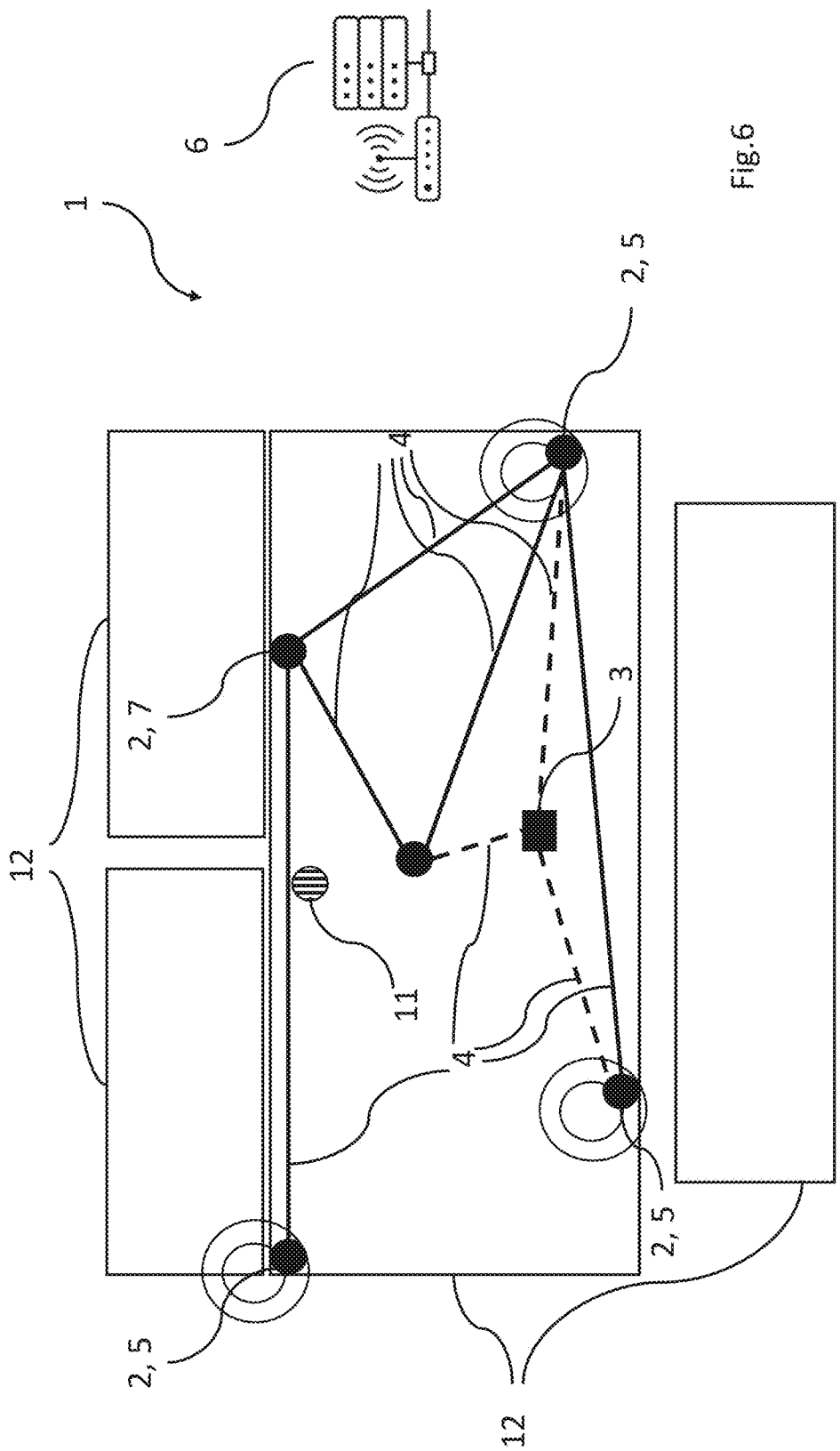

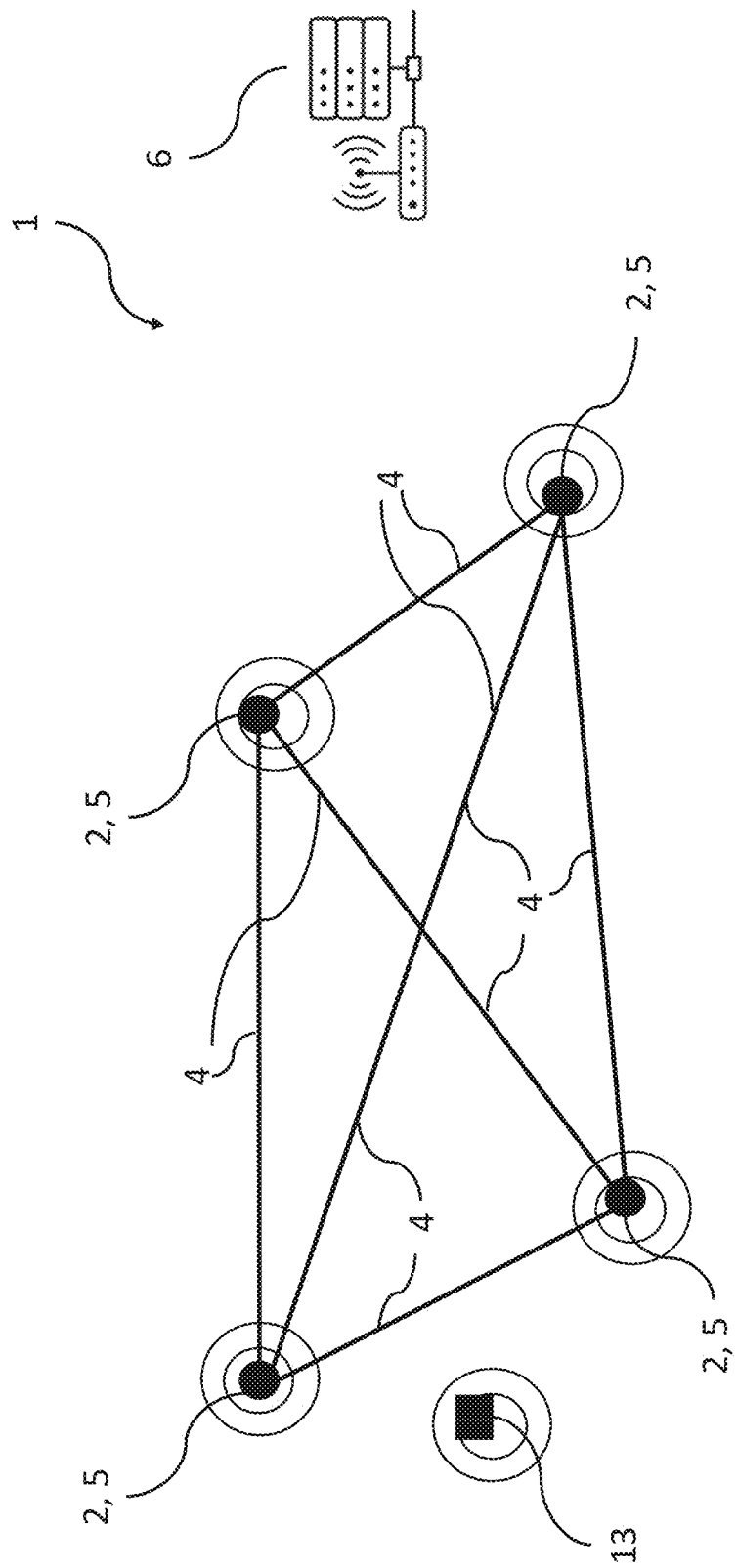

METHOD FOR SETTING UP A LOCALIZATION SYSTEM, AND LOCALIZATION SYSTEM

CROSS REFERENCE TO RELATED APPLICATIONS

This application is a continuation of International Application No. PCT/EP2023/053500 (WO 2023/169776 A1), filed on Feb. 13, 2023, and claims benefit to German Patent Application No. DE 10 2022 105 717.8, filed on Mar. 10, 2022. The aforementioned applications are hereby incorporated by reference herein.

FIELD

Embodiments of the present invention relate to a method for setting up a localization system and a localization system.

BACKGROUND

A localization system is known from EP 3 002 603 A1.

In a localization system, relative location references, for example distances or angles, are determined between stationary units and a mobile unit. The position of the mobile unit is determined from the known positions of the stationary units by means of the relative location references. Precise knowledge of the position of the stationary units is important for the accurate positioning of the mobile unit. Determining the positions of the stationary units when setting up the localization system has so far been very laborious.

SUMMARY

Embodiments of the present invention provide a method for setting up a localization system that includes a multiplicity of stationary radio transmitters and at least one mobile radio transmitter. The method includes determining, by the localization system, multiple relative location references between the mobile radio transmitter and a respective stationary radio transmitter by using an ultra-wideband radio technology. Each of a plurality of stationary radio transmitters of the multiplicity of stationary radio transmitters includes a respective mobile radio module. The method further includes performing a positioning of the stationary radio transmitters with the mobile radio module by performing a coarse localization and a fine localization. The coarse localization is performed via mobile radio. The positioning of the stationary radio transmitters via the coarse localization is improved by the fine localization. The method further includes determining a position of the mobile radio transmitter using the positioning of the stationary radio transmitters improved by the fine localization.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 6 shows a schematic view of the localization system from FIG. 5 after a fine localization using a comparison with the possible positions of the map, according to some embodiments; and FIG. 7 shows a schematic view of a localization system with a coarse localization of a mobile radio transmitter with a mobile radio module, according to some embodiments.

DETAILED DESCRIPTION

Figure 1:
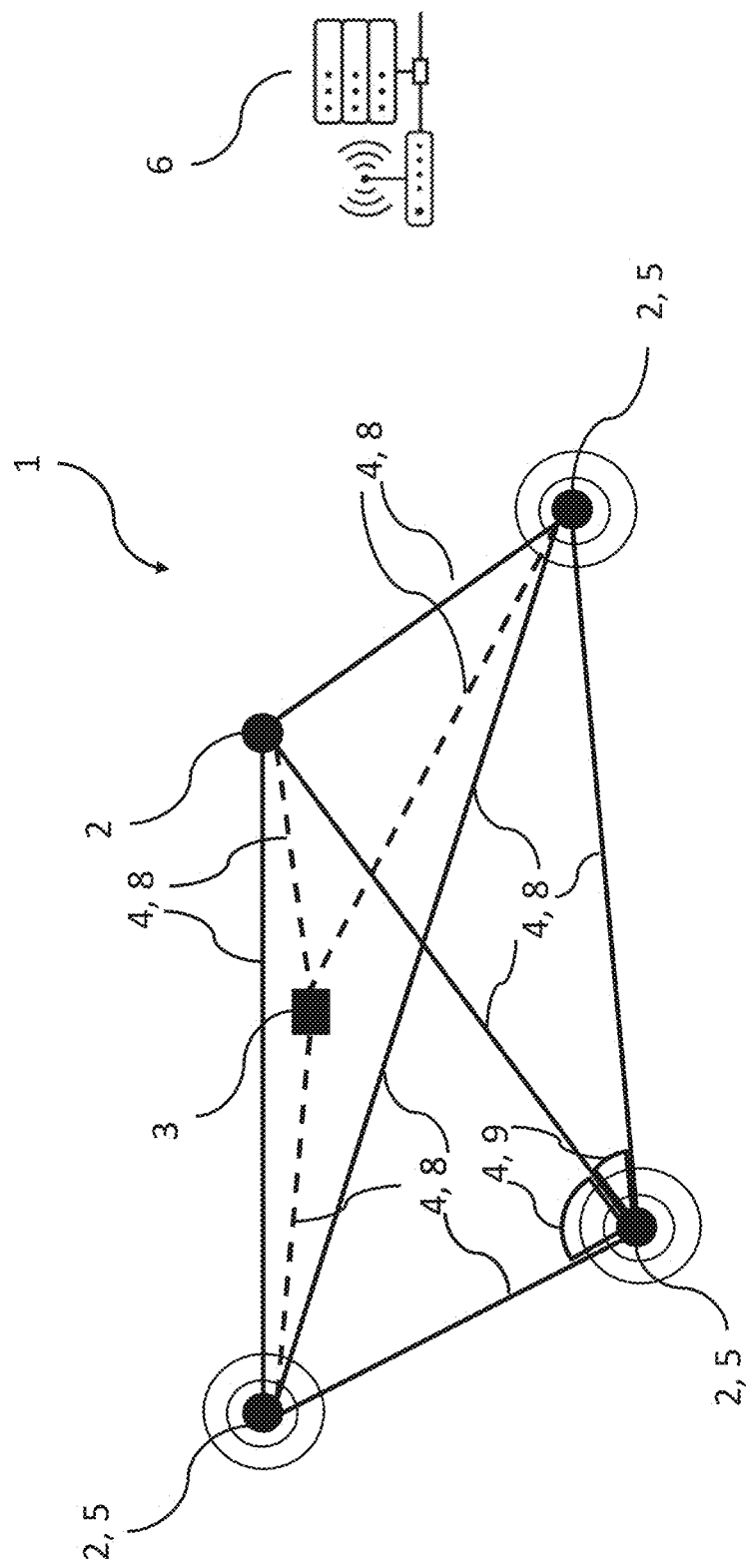
FIG. 1 shows a schematic view of a localization system after the coarse localization according to some embodiments.

Embodiments of the present invention provide a method that simplifies the setting up of a localization system. Furthermore, a localization system is provided using which such a method can be implemented.

According to embodiments of the invention, the localization system comprises a multiplicity of stationary radio transmitters and at least one mobile radio transmitter, wherein the localization system determines multiple relative location references between the mobile radio transmitter and at least one stationary radio transmitter by means of an ultra-wideband radio technology, wherein a plurality of the stationary radio transmitters comprise one mobile radio module each, wherein a positioning of the stationary radio transmitters with a mobile radio module is carried out by means of a coarse localization and a fine localization, wherein the coarse localization is carried out by means of mobile radio, wherein the positioning via the coarse localization is improved by means of a fine localization, wherein the positioning of the stationary radio transmitters from the fine localization is used for determining the position of the mobile radio transmitter.

In principle, the stationary radio transmitters and the mobile radio transmitters can have the same design. The radio transmitters can exchange signals with one another by means of an ultra-wideband radio technology. Relative location references between the radio transmitters can be determined from the received signals. The relative location references can be determined between stationary radio transmitters and mobile radio transmitters as well as between different stationary radio transmitters or different mobile radio transmitters.

At least a plurality of the stationary radio transmitters can be localized by means of mobile radio. Mobile radio is understood here, for example, as radio communication according to one of the GSM, UMTS, LTE or 5G standards. In this regard, radio communication according to the LTE standard is preferred and radio communication according to the 5G standard is preferred. It is to be understood that future mobile radio standards can also be used. Since this localization is typically only accurate to a few meters, this localization is improved in a second step by means of a fine localization. The positions of these stationary radio transmitters can thus be determined in a fully automatic manner. Based on these positions, the positions of the other stationary radio transmitters and the mobile radio transmitters can be determined. The localization system is thus set up in a fully automatic manner.

Preferably, the localization system comprises a computing unit, wherein the computing unit communicates with at least one of the stationary radio transmitters with a mobile radio module via mobile radio.

Communication via mobile radio means that the mobile radio module is not only used for localization. Radio transmitters without a mobile radio module can communicate with other radio transmitters by means of the ultra-wideband radio technology or another radio technology, such as WLAN or Bluetooth. The computing unit can thus communicate directly or indirectly with all radio transmitters without the need for a cable. This further simplifies the setting up of the localization system. The use of stationary radio transmitters using wired communication is still possible, but not necessary.

Preferably, the computing unit is part of a data center. The computing unit can also be a virtual computer. At least the last part of the communication path between the computing unit and the radio transmitter is preferably handled via mobile radio.

Preferably, the coarse localization and/or the fine localization is carried out on the computing unit. Carrying out the localization on the computing unit ensures a consistent quality of the localization for all stationary radio transmitters with a mobile radio module.

In one embodiment, at least some of the stationary radio transmitters with a mobile radio module determine at least two relative location references in relation to at least one other stationary radio transmitter with a mobile radio module and the fine localization is carried out by computationally combining the relative location references with the coarse localization, wherein the relative location references are determined by means of the ultra-wideband radio technology. As the relative location references can be determined to within a few centimeters by means of the ultra-wideband radio technology, the different inaccuracies in the coarse localization of the stationary radio transmitters with a mobile radio module can be largely compensated for by the computational combination. The accuracy of the relative location references can be increased by a suitable computational combination of the relative location references with the coarse localization, for example using a Kalman filter. Preferably, distances and/or angles between the stationary radio transmitters with a mobile radio module are determined from the positions of the stationary radio transmitters with a mobile radio module determined during the coarse localization for the computational combination.

In one embodiment, the relative location references between the radio transmitters with a mobile radio module are determined indirectly via relative location references in relation to radio transmitters without a mobile radio module. The indirect determination of the relative location references also allows for the computational combination of coarse localizations of radio transmitters with a mobile radio module for which a direct determination of the relative location references is not possible.

Preferably, the relative location references include at least one distance information between the radio transmitters. In this regard, the distance information can be a specific length indication or also a difference in length. A difference in length can be calculated from time-difference-of-arrival (TdoA) algorithms, for example.

Preferably, the relative location references include at least one angle between the radio transmitters.

The relative positions of the stationary radio transmitters with a mobile radio module can be calculated based on multiple distances by trilateration, based on multiple angles by triangulation or based on a combination of distances and angles. The stationary radio transmitters are often mounted at the same height. In this case, two relative location references are already sufficient in order to determine the relative positions of the stationary radio transmitters with a mobile radio module. The accuracy of the fine localization can be further increased by using multiple relative location references.

In one embodiment, all stationary radio transmitters which have determined relative location references in relation to one another are treated as a group on the computing unit. By treating them as a group, the computing unit can be used for multiple groups of stationary radio transmitters, wherein the groups have no relation to one another.

The fine localization is preferably carried out jointly for all stationary radio transmitters of a group. The joint fine localization ensures that the positions of all stationary radio transmitters of a group are determined in the same manner.

In one embodiment, the fine localization is carried out by comparing the coarse localization with a map. By means of comparison with the map, deviations in the coarse localization, which affect all stationary radio transmitters with a mobile radio module equally, can be corrected.

In one embodiment, a plurality of possible positions of the stationary radio transmitters are present in the map and the stationary radio transmitters with a mobile radio module are each assigned to a possible position based on the coarse localization. The possible positions indicate exact positions of the stationary radio transmitters. The stationary radio transmitters with a mobile radio module can each be assigned to a possible position very easily, preferably automatically, using the coarse localization. In a preferred embodiment, stationary radio transmitters without a mobile radio module can each be assigned to a possible position via relative location references in relation to stationary radio transmitters with a mobile radio module. The number of possible positions can be greater than, equal to or less than the number of stationary radio transmitters. If the number of positions is greater, some positions are not assigned a stationary radio transmitter. If the number is less, the positions of the stationary radio transmitters that were not assigned to a possible position are determined differently, for example via the fine localization including a computational combination with the relative location references.

In one embodiment, at least one environmental boundary, in particular a building boundary, is present in the map, wherein at least some of the stationary radio transmitters are treated as a group and the fine localization is carried out in such a way that the positions of all stationary radio transmitters of the group lie within the environmental boundary. In this regard, the assignment of the stationary radio transmitters to a group can be predetermined or, as described above, be carried out based on the relative location references. Groups of stationary radio transmitters are typically placed in a fixed environment. By means of comparison with the map, deviations in the coarse localization that lead to positions outside of the region can be compensated for. The environmental boundaries are preferably determined from a publicly accessible map. Such maps are available from various providers via the Internet. The environmental boundaries can also be determined from a satellite image, in particular in the case of building boundaries.

The fine localizations by computational combination with the relative location references and the comparison with the map are preferably combined.

In one embodiment, the localization system comprises at least one mobile radio transmitter with a mobile radio module, wherein a coarse localization of the mobile radio transmitter with a mobile radio module is carried out by means of mobile radio,
wherein a deviation between the positioning of the stationary radio transmitters with a mobile radio module via the coarse localization and the positioning of the stationary radio transmitters with a mobile radio module via the fine localization is used in order to improve the coarse localization of the mobile radio transmitter with a mobile radio module. For example, the deviation of the nearest stationary radio transmitter with a mobile radio module can be used to improve the coarse localization. Alternatively, a mean deviation of multiple stationary radio transmitters with a mobile radio module can be used to improve the coarse localization. In this regard, the deviation can be weighted according to the distance between the stationary radio transmitters with a mobile radio module and the mobile radio transmitter with a mobile radio module. Alternatively, a suitable Kalman filter can be used for weighting.

Embodiments of the invention also relate to a localization system comprising a multiplicity of stationary radio transmitters, wherein a plurality of the stationary radio transmitters comprise one mobile radio module each, wherein the localization system is provided and designed to carry out a method according to embodiments of the invention.

Preferably, the localization system comprises a computing unit, wherein the computing unit is connected to the stationary radio transmitters with a mobile radio module via mobile radio.

Preferably, one or more additional pieces of information are known to the computing unit. Alternatively or additionally, additional information can be provided by the user. The additional information can be used to improve the fine localization. Preferably, the computing unit comprises a user interface, for example in the form of a website. In this regard, access to the user interface can preferably be provided by information on a radio transmitter, for example in the form of a QR code. The additional information can be entered by the user via the user interface. In this regard, the additional information can preferably be queried via the user interface in a guided manner. Preferred additional pieces of information are:

Information as to which stationary radio transmitters have direct visual contact
Information as to which stationary radio transmitters are located on one level
Selection of an alternative with multiple possible fine localizations
Information regarding an environmental boundary, in particular a building, on the map
Information regarding a floor for one or more stationary radio transmitters The following description of preferred embodiments serves to explain the invention in greater detail in association with the drawings.

Elements that are the same or have equivalent functions are denoted by the same reference symbols in all the exemplary embodiments.

FIG. 1 shows a schematic view of a localization system 1. In this example, the localization system 1 comprises four stationary radio transmitters 2 and one mobile radio transmitter 3. Relative location references 4 are determined between the stationary radio transmitters 2 by means of an ultra-wideband radio technology. In this example, relative location references are determined from each stationary radio transmitter 2 in relation to every other stationary radio transmitter 2. Relative location references 4 are also determined between the mobile radio transmitter 3 and multiple stationary radio transmitters 2. In this example, three relative location references 4 are determined between the mobile radio transmitter 3 and three stationary radio transmitters 2. Three of the four stationary radio transmitters 2 are stationary radio transmitters with a mobile radio module 5. The stationary radio transmitters with a mobile radio module 5 communicate with a computing unit 6 via mobile radio. For the stationary radio transmitters with a mobile radio module 5, a coarse localization is carried out by means of mobile radio. In this example, the coarse localization is carried out by the computing unit 6. The fourth stationary radio transmitter 2 and the mobile radio transmitter 3 are radio transmitters without a mobile radio module 7. The radio transmitters without a mobile radio module 7 and the stationary radio transmitters with a mobile radio module 5 can communicate by means of the ultra-wideband radio technology. In this example, the relative location references 4 each comprise a distance 8 between the radio transmitters 2, 3. A stationary radio transmitter 2 additionally determines two angles 9 in relation to the other stationary radio transmitters 2. The positions of the stationary radio transmitter without a mobile radio module 7 and the mobile radio transmitter 3 are determined from the coarse localization of the stationary radio transmitters with a mobile radio module 5 and the relative location references. It is to be understood that, in particular in a localization system 1 with more stationary radio transmitters 2 than shown here, it is not necessary to determine every possible relative location reference 4 between the stationary radio transmitters.

Figure 2:
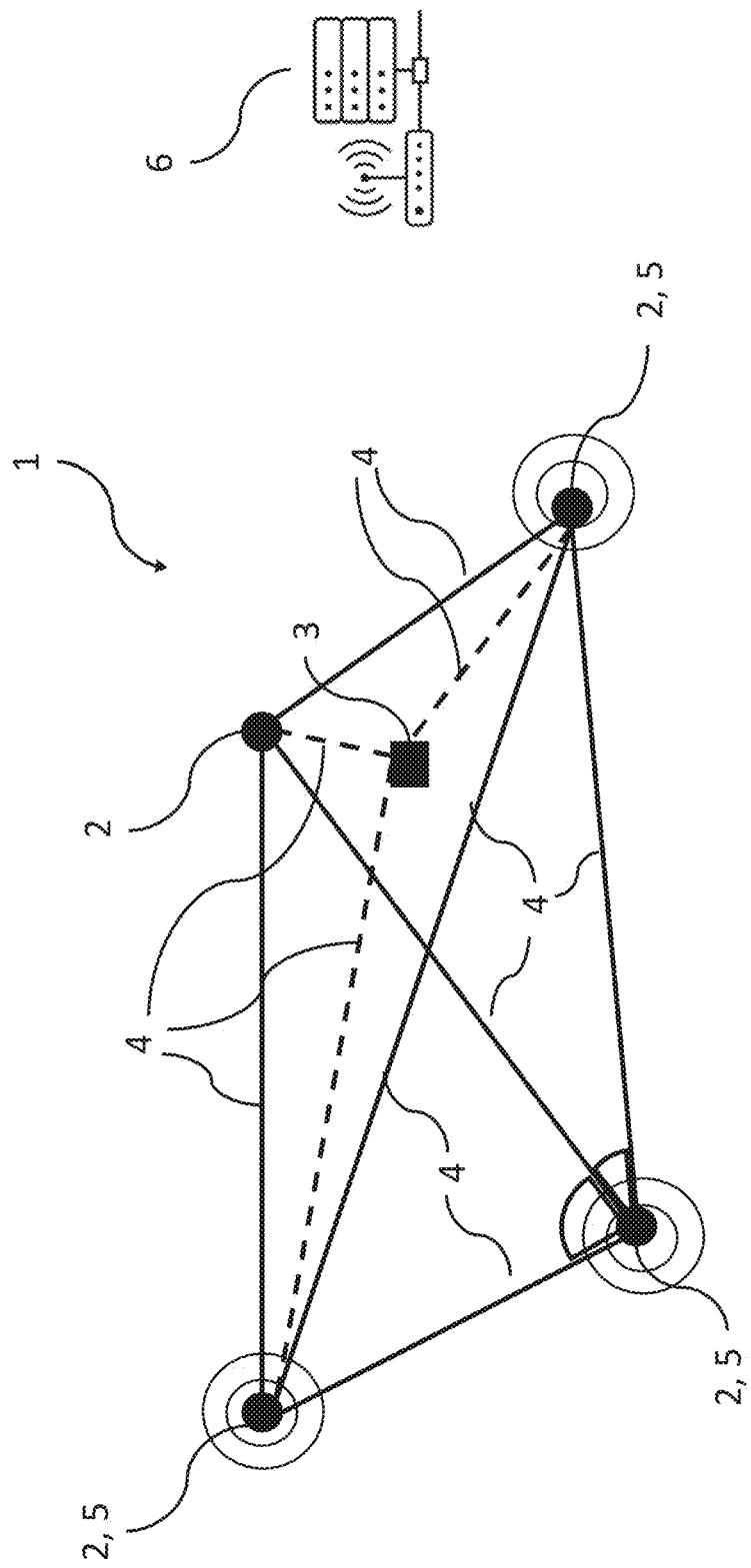
FIG. 2 shows a schematic view of the localization system from FIG. 1 with a fine localization using relative location references according to some embodiments.

FIG. 2 shows a schematic view of the localization system 1 from FIG. 1 with a fine localization using relative location references 4. Only the differences in relation to FIG. 1 are described below. For the fine localization, the relative location references 4 are computationally combined with the coarse localization in this example. In this example, the computational combination is carried out by the computing unit 6. It is to be understood that the computational combination can also be carried out using a computing unit other than the one used for the coarse localization. For the sake of simplicity, only one computing unit 6 is shown here. The circles show the position determined during the coarse localization for the stationary radio transmitters with a mobile radio module 5. The positions determined during the fine localization are partially offset from the positions determined during the coarse localization. Due to the more precisely determined positions of the stationary radio transmitters with a mobile radio module 5, the positions of the radio transmitters without a mobile radio module 7, in particular the position of the mobile radio transmitter 3, can also be determined more precisely.

Figure 3:
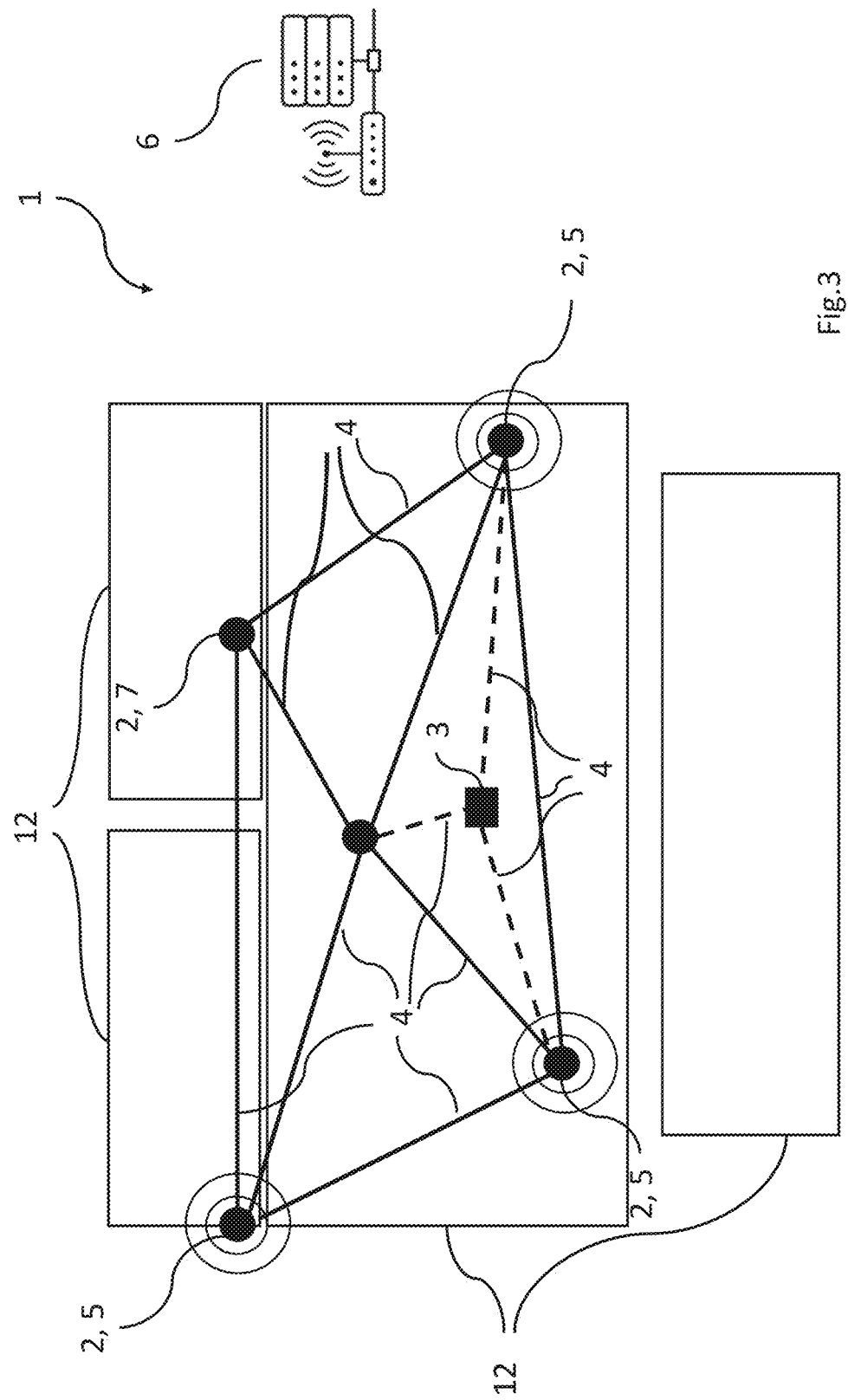
FIG. 3 shows a schematic view of a localization system and a map according to some embodiments.

FIG. 3 shows a schematic view of a localization system 1 and a map 10. A coarse localization is carried out for the stationary radio transmitters with a mobile radio module 5. In this example, the coarse localization is carried out by the computing unit 6. Relative location references are determined between the stationary radio transmitters 2. In this example, direct relative location references 4 are not determined from each stationary radio transmitter 2 in relation to every other stationary radio transmitter 2. Some relative location references can only be determined indirectly via other relative location references 4. When indirectly determining the relative location references 4, relative location references 4 in relation to mobile radio transmitters 3 can also be used.

Figure 4:
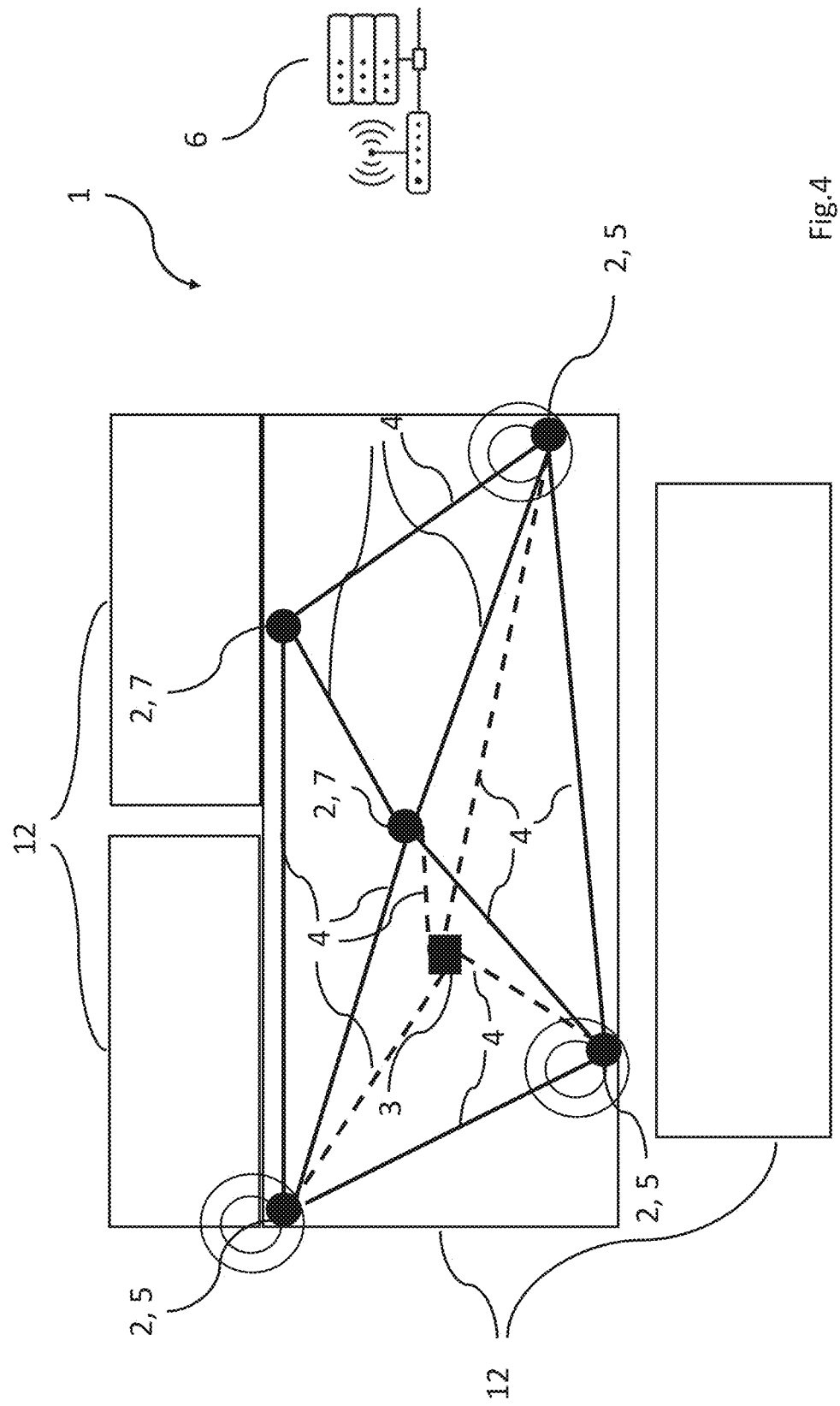
FIG. 4 shows a schematic view of the localization system from FIG. 3 after a fine localization using a comparison with environmental boundaries of the map, according to some embodiments.

FIG. 4 shows a schematic view of the localization system from FIG. 3 after a fine localization using a comparison with environmental boundaries 12 of the map 10. In this example, it is known that all stationary radio transmitters 2 are located inside the same building. All stationary radio transmitters 2 are treated as a group by the computing unit 6. In this example, the group is determined via the relative location references 4. The computing unit 6 recognizes from the comparison of the positions from the coarse localization and the environmental boundaries 12, as shown in FIG. 3, that a position of a stationary radio transmitter with a mobile radio module 5 from the coarse localization and a position of a stationary radio transmitter without a mobile radio module 7, which was determined from the coarse localization and the relative location references 4, do not lie within the same environmental boundary 12. In order to correct this, the computing unit 6 shifts all positions of the stationary radio transmitters in the same way during the fine localization so that the positions of all stationary radio transmitters 2 lie within the same environmental boundary 12. In addition to the comparison with the map 10, the positions of the stationary radio transmitters 2 can be improved during the fine localization based on the relative location references 4.

Figure 5:
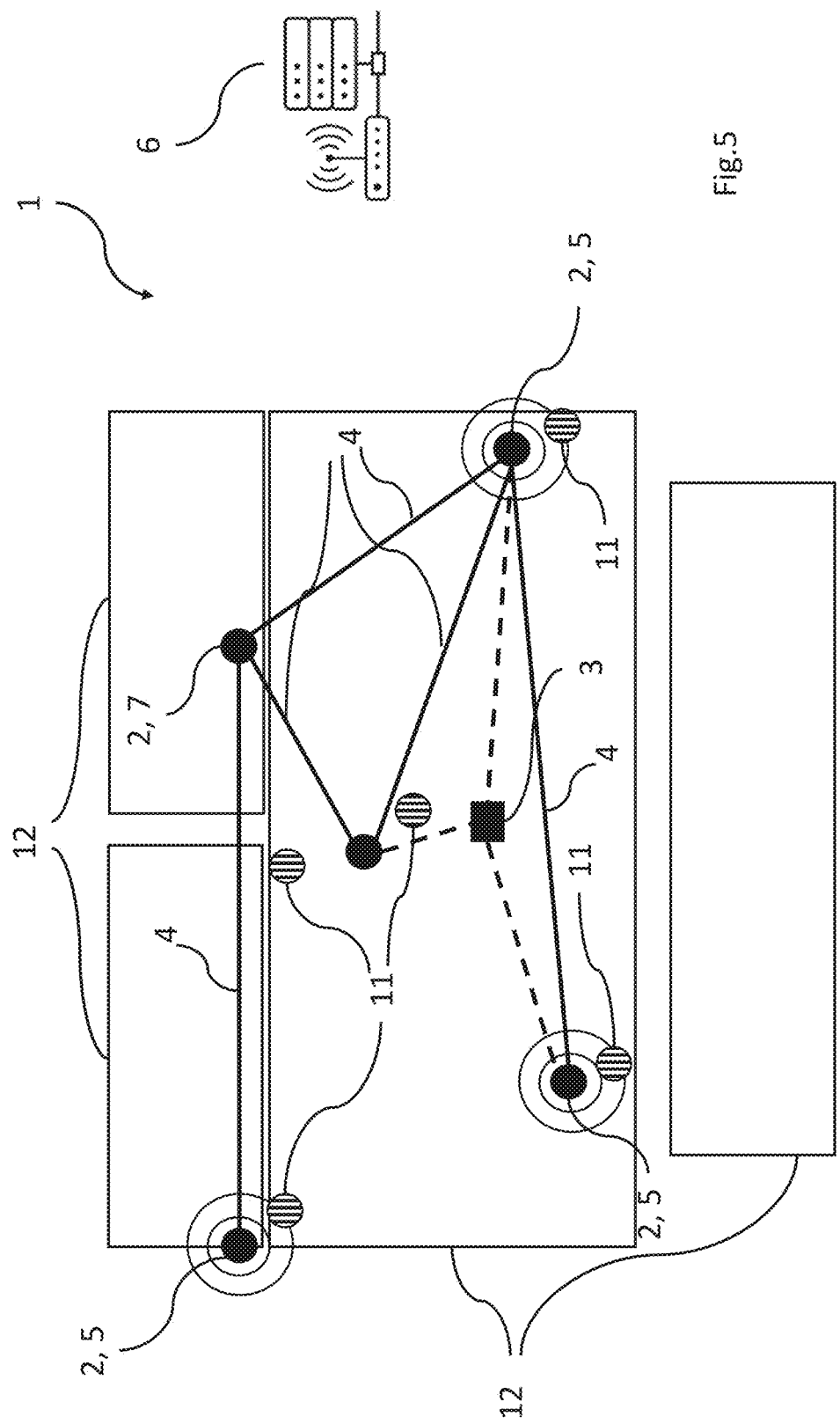
FIG. 5 shows a schematic view of a localization system and a map with possible positions' according to some embodiments.

FIG. 5 shows a schematic view of a localization system 1 and a map 10 with possible positions 11. In contrast to the view in FIG. 3, FIG. 5 shows possible positions 11 of the stationary radio transmitters 2 in the map 10. By comparing the positions from the coarse localization and the possible positions 11, the computing unit 6 recognizes that multiple stationary radio transmitters 2 can each be assigned to a possible position 11. As relative location references 4 between the stationary radio transmitters 2 exist, the assignment is made by the computing unit 6 in such a way that the relative location references 4 match the assigned possible positions 11 as closely as possible.

FIG. 6 shows a schematic view of the localization system from FIG. 5 after a fine localization using a comparison with the possible positions 11 of the map 10. No stationary radio transmitter 2 was assigned to a possible position 11. In this example, an assignment would not be reconcilable with the relative location references 4 between the stationary radio transmitters 2. A stationary radio transmitter 2 was not assigned to a possible position 11, but its position was determined via the relative location references 4.

FIG. 7 shows a schematic view of a localization system 1 with a coarse localization of a mobile radio transmitter 13 with a mobile radio module. The computing unit 6 determines a position for the mobile radio transmitter with a mobile radio module 13 using a coarse localization by means of mobile radio. For the stationary radio transmitters with a mobile radio module of the localization system 1, the computing unit 6 first determines a position via a coarse localization and then improves the position via a fine localization. The computing unit 6 determines an improvement in the position of the mobile radio transmitter with a mobile radio module 13 from the difference in the positions of the stationary radio transmitters after the coarse localization and after the fine localization.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Localization system
2 Stationary radio transmitter
3 Mobile radio transmitter
4 Relative location reference
5 Stationary radio transmitter with a mobile radio module
6 Computing unit
7 Radio transmitter without a mobile radio module
8 Distance
9 Angle
10 Map
11 Possible position
12 Environmental boundary
13 Mobile radio transmitter with a mobile radio module

The invention claimed is:

1. A method for setting up a localization system, the localization system comprising a multiplicity of stationary radio transmitters and a mobile radio transmitter, the multiplicity of stationary radio transmitters comprising mobile radio-enabled stationary radio transmitters, the mobile radio-enabled stationary radio transmitters each being configured for radio communication using a mobile radio technology, the method comprising:
   determining, using an ultra-wideband radio technology, at least one relative location reference between the mobile radio transmitter and at least one of the stationary radio transmitters;
   determining positions of the mobile radio-enabled stationary radio transmitters by:
      performing a coarse localization to determine coarse positions, the coarse localization being performed using the mobile radio technology, and
      then performing a fine localization to improve the coarse positions; and
   determining a position of the mobile radio transmitter using at least one of the determined positions of the mobile-radio enabled stationary radio transmitters and the at least one relative location reference between the mobile radio transmitter and the at least one of the stationary radio transmitters.

2. The method according to claim 1, wherein the localization system further comprises a computing unit, wherein the computing unit communicates using the mobile radio technology with at least one of the plurality of mobile radio-enabled stationary radio transmitters.

3. The method according to claim 2, wherein all of the stationary radio transmitters that have determined the relative location references in relation to one another are treated as a group on the computing unit.

4. The method according to claim 3, wherein the fine localization is performed jointly for all of the stationary radio transmitters of the group.

5. The method according to claim 1, wherein the coarse localization and/or the fine localization is performed by the computing unit.

6. The method according to claim 1,
wherein the method further comprises determining, for at least some of the plurality of mobile radio-enabled stationary radio transmitters, at least two relative location references in relation to at least one other of the mobile radio-enabled stationary radio transmitters, the at least two relative location references being determined using the ultra-wideband radio technology, and
wherein the fine localization is configured to increase the accuracy of the coarse positions by adjusting the coarse positions based on the at least two relative location references.

7. The method according to claim 6,
wherein the multiplicity of stationary radio transmitters further comprises non-mobile radio stationary radio transmitters that are not configured for radio communication using the mobile radio technology, and
wherein some of the relative location references between the mobile radio-enabled stationary radio transmitters are determined indirectly via relative location references in relation to the non-mobile radio stationary radio transmitters.

8. The method according to claim 6, wherein the at least two relative location references comprise at least one distance information between at least two of the mobile radio-enabled stationary radio transmitters.

9. The method according to claim 6, wherein the at least two relative location references comprise at least one angle between at least two of the mobile radio-enabled stationary radio transmitters.

10. The method according to claim 6, wherein performing the fine localization comprises computationally combining the at least two relative location references with the coarse positions determined using the coarse localization by using a Kalman filter.

11. The method according to claim 1, wherein the fine localization is performed by comparing the coarse positions with a map indicating physical information of an environment comprising the stationary radio transmitters.

12. The method according to claim 11,
wherein the physical information indicated in the map comprises a plurality of possible positions of the stationary radio transmitters in the environment, and
wherein performing the fine localization comprises assigning each of the mobile radio-enabled stationary radio transmitters to a respective one of the possible positions based on the coarse positions.

13. The method according to claim 11,
wherein the physical information indicated in the map comprises at least one environmental boundary, and
wherein performing the fine localization comprises:
treating at least some of the stationary radio transmitters as a group, and
determining that the positions of all of the stationary radio transmitters of the group lie within the environmental boundary.

14. The method according to claim 1,
wherein the mobile radio transmitter is configured for radio communication using the mobile radio technology,
wherein the method further comprises performing a second coarse localization to determine a coarse position of the mobile radio transmitter, the second coarse localization using the mobile radio technology, and
wherein determining the position of the mobile radio transmitter comprises:
determining a deviation between the determined coarse positions of the mobile radio-enabled stationary radio transmitters and the positions of the mobile stationary radio transmitters improved using the fine localization, and
updating the coarse position of the mobile radio transmitter based on the determined deviation.

15. The method according to claim 1, wherein the mobile radio-enabled stationary radio transmitters comprises a mobile radio module configured for the radio communication using the mobile radio technology, the mobile radio technology comprising: GSM, UMTS, LTE, or 5G, and wherein mobile radio technology does not comprise: WLAN, Bluetooth, or ultra-wideband radio.

16. A localization system comprising the multiplicity of stationary radio transmitters, wherein the localization system is configured to carry out the method according to claim 1.

17. The localization system according to claim 16, further comprising a computing unit, wherein the computing unit is communicatively connected to the plurality of mobile radio-enabled stationary radio transmitters using the mobile radio technology.

* * * * *